US006973077B1

(12) United States Patent
Olsson et al.

(10) Patent No.: US 6,973,077 B1
(45) Date of Patent: Dec. 6, 2005

(54) METHOD AND APPARATUS FOR AUTO-DETECTION OF LAN, MODEM, OR ISDN UTILIZING A COMMON CONNECTION TO A PERIPHERAL COMPONENT

(75) Inventors: Fredrik Olsson, Cupertino, CA (US); Jason Fung, Milpitas, CA (US); Gary Wang, Cupertino, CA (US)

(73) Assignee: 3Com Corporation, Santa Clara, CA (US)

(*) Notice: Subject to any disclaimer, the term of this patent is extended or adjusted under 35 U.S.C. 154(b) by 778 days.

(21) Appl. No.: 09/617,480

(22) Filed: Jul. 17, 2000

(51) Int. Cl.[7] .......................... H04L 12/28; H04L 12/66

(52) U.S. Cl. ...................... 370/359; 370/419; 370/463; 370/465; 709/250

(58) Field of Search ................................ 370/359, 463, 370/465–467, 419; 709/230, 226–227, 250, 709/238

(56) References Cited

U.S. PATENT DOCUMENTS 5,142,528 A * 8/1992 Kobayashi et al. ......... 370/469
5,249,183 A * 9/1993 Wong et al. ................ 370/228
5,442,629 A * 8/1995 Geyer et al. ................ 370/252
5,497,460 A * 3/1996 Bailey et al. ................. 714/39
5,530,842 A * 6/1996 Abraham et al. ........... 709/221
5,568,525 A * 10/1996 de Nijs et al. .............. 375/356
5,574,722 A * 11/1996 Slykhouse et al. .......... 370/257
5,586,117 A * 12/1996 Edem et al. ................ 370/466
5,671,251 A * 9/1997 Blackwell et al. .......... 375/222
6,434,123 B1 * 8/2002 Park ........................... 370/293
6,504,851 B1 * 1/2003 Abler et al. ................ 370/466
6,594,707 B1 * 7/2003 Rubinstein et al. ......... 709/250

* cited by examiner

*Primary Examiner*—Hassan Kizou
*Assistant Examiner*—Gregory Sefcheck

(57) ABSTRACT

A method and apparatus for allowing multiple types of connections to be made to a peripheral component. In one embodiment, the present invention provides a peripheral component with a receptacle having a number of electrical connecting lines. At least one of the electrical lines is used as a signal line by more than one type of connection, which is made directly to the receptacle. Next, the present invention switches the electrical connecting lines between a number of electrical pathways. Next, the present invention determines the type of connection being made to the receptacle. In so doing, an electrical pathway which is appropriate for the connection-type is established.

7 Claims, 8 Drawing Sheets

160

| Pin 402 | Modem 150 | LAN 152 | ISDN 154 |
|---|---|---|---|
| 1. | Unused | TD+ | PSo3 |
| 2. | Unused | TD- | PSo3 |
| 3. | Unused | RD+ | TD+ |
| 4. | Tip | Unused | RD+ |
| 5. | Ring | Unused | RD- |
| 6. | Unused | RD- | TD- |
| 7. | Unused | Unused | PSi2 |
| 8. | Unused | Unused | PSi2 |

FIG. 1

| | LAN 152 | Modem 150 | ISDN 154 |
|---|---|---|---|
| Relay 507 | A | - | B |
| Relay 508 | - | A | B |
| Relay 506 | A | - | - |

FIG. 8

METHOD AND APPARATUS FOR AUTO-DETECTION OF LAN, MODEM, OR ISDN UTILIZING A COMMON CONNECTION TO A PERIPHERAL COMPONENT

TECHNICAL FIELD

The present invention generally pertains to the field of computer networking. More particularly, the present invention is related to allowing multiple types of connections to be made to a peripheral component.

BACKGROUND ART

Computers have become an integral tool used in a wide variety of different applications, such as in finance and commercial transactions, computer-aided design and manufacturing, health care, telecommunication, education, etc. Computers are finding new applications as a result of advances in hardware technology and rapid development in software technology. Furthermore, a computer system's functionality is dramatically enhanced by connecting it to a network, another computer, or a device such as a FAX machine. This allows the computer to exchange files; share information stored on a common database; connect to the Internet; and communicate via FAXes, e-mail, and teleconferencing.

A variety of types of connections can be made to a computer to achieve the above functionality. For example, local area networks (LAN) connect multiple computers together such that the users of the computers can access the same information and share data. Modems allow a computer to connect to the Internet and also to communicate via FAXes. Also, integrated services digital networks (ISDN) provide another avenue to connect to the Internet. In some instances, in order make such connections, a peripheral component generally known as a network interface card (NIC) must be inserted into the general purpose computer. Next, a jack which interfaces with the modem, LAN, or ISDN is plugged into the peripheral component. Essentially, the peripheral component works with the operating system and central processing unit (CPU) of the host computer to control the flow of information over the various types of connections.

The jack of the modem, LAN, or ISDN is conventionally plugged into a conventional receptacle, such as an RJ-45 or an RJ-11. However, connecting different types of connections to the same receptacle on a peripheral component is problematic. FIG. 1 shows the industry standard pin or electrical connection line 402 configurations for a connection between a conventional receptacle (such as an RJ-11 or an RJ-45) and a jack attached to a cable used by Modem 150, LAN 152, or ISDN 154 connection. Referring to FIG. 1, it is clear that various connection-types 160 utilize the electrical connection lines 402 differently. For example, a modem connection 150 uses just 2 electrical connection lines 402: lines 4 and 5. However, a LAN connection 152 uses 4 electrical connection lines 402: lines 1, 2, 3, and 6. An ISDN connection 154 may use up to 8 electrical connection lines. Thus, constraints are placed on which lines of the receptacle of the peripheral component are used for each connection-type 160. Unfortunately, when using a conventional receptacle some of the electrical connection lines 402 are used by more than one type of connection 160. For example, as FIG. 1 shows, ISDN 154 transmits signals utilizing electrical connection lines 402 common to both a modem 150 and a LAN 152 connection. This can make it difficult for a computer system to determine which type of connection 160 is being made to the peripheral component.

In one prior art system, the user may make a connection to either a LAN 152 or a modem 150 using a single peripheral component, as LAN 152 and modem 150 do not transmit signals on the same electrical connection lines 402 when using either RJ-45 or RJ-11 receptacles. The computer system can determine whether the peripheral component is connected to a LAN 152 or a modem 150 and initiate the proper software so that the LAN 152 or modem 150 may utilize the electrical connection lines 402 of the receptacle as signal lines. However, in this prior art example, because ISDN 154 transmits signals over electrical connection lines 402 which both modem 150 and LAN 152 use to transmit signals, the computer system is unable to determine what type of connection 160 is being made. Therefore, the user may not connect to an ISDN 154 without a separate peripheral component. Consequently, the user must purchase a separate peripheral component and keep track of which peripheral component to use for which type of connection 160.

In another prior art system, although the user may use one peripheral component for LAN 152, modem 150, and ISDN 154 connections, in order to connect to an ISDN 154 the user must first insert an intermediate connection device into the receptacle of the peripheral component. Next, the user must plug the ISDN jack into the intermediate connection device. Thus, the intermediate connection device serves as an adapter and is sometimes known as a podule. The computer system is able to determine the type of connection and initiate the proper software so that the LAN 152, modem 150, or ISDN 154 may transmit signals over the electrical connection lines 402 which industry standards constrain them to use. However, the intermediate connection device not only adds cost to the user, but also makes using the computer more complicated. If the user loses the intermediate connection device, the user cannot connect the computer to an ISDN 154. Furthermore, the intermediate connection device is bulky, which is undesirable, especially for a laptop computer systems.

Thus, a need has arisen for a method and apparatus for allowing multiple types of connections, such as LAN 152, modem 150, and ISDN 154, to be made to a single peripheral component. A further need exists for such a method and apparatus which allows such connections without using an intermediate connection device. A still further need exists for such a method and apparatus which is low in cost, easy to use, and compact. A further need exists for such a system in which the user may connect a LAN 152, a modem 150, or an ISDN 154 into a single peripheral component without considering whether the connection-type is a LAN 152, a modem 150, or an ISDN 154.

SUMMARY

The present invention provides a provides a method and apparatus for allowing multiple types of connections, such as LAN, modem, and ISDN to be made to a single peripheral component. The present invention accomplishes this without using an intermediate connection device. The present invention is low in cost, easy to use, and compact. The present invention further provides a method and apparatus which allows the user to connect a LAN, a modem, or an ISDN to a single peripheral component without considering the connection-type.

A method and apparatus for allowing multiple types of connections to be made to a peripheral component. In one embodiment, the present invention provides a peripheral component with a receptacle having a number of electrical connecting lines. At least one of the electrical connecting lines is used as a signal line by more than one type of connection, which is made directly to the receptacle. Next, the present invention switches the electrical connecting lines between a number of electrical pathways. Next, the present invention determines the type of connection being made to the receptacle. In so doing, an electrical pathway which is appropriate for the connection-type is established.

In another embodiment, the present invention further includes a method for determining whether the connection-type is a LAN, a modem, or an ISDN. In such an embodiment, the present invention performs the steps of the previous embodiment, and further includes the step of determining that the connection is either a LAN, a modem, or an ISDN.

In still another embodiment, the present invention allows multiple types of connections to be made to a peripheral component without requiring the use of an intermediate connection device.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 1 is a table of the electrical line configurations for LAN, modem, and ISDN connection-types, according to industry standard.

FIG. 8 is a table showing the positions for the relays of FIG. 7 to establish an electrical connection between the receptacle and each connection-type determination device, in accordance with one embodiment of the present claimed invention.

Figure 2:
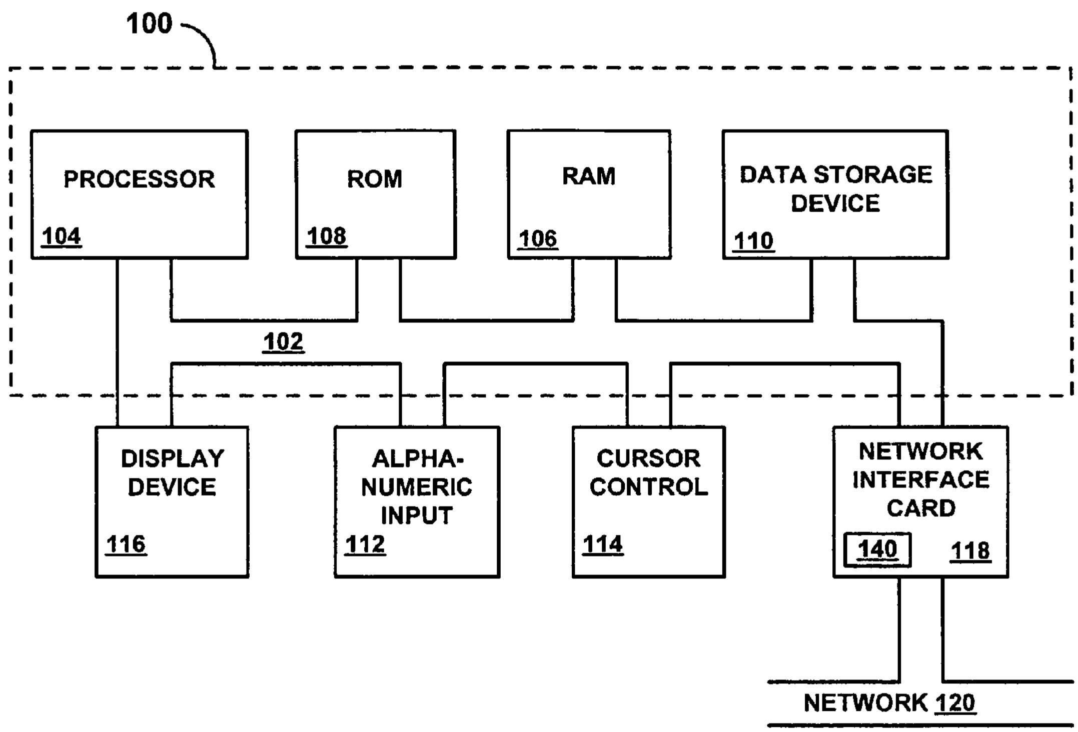
FIG. 2 is a schematic diagram of an exemplary computer system with the peripheral component coupled to it, in accordance with one embodiment of the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "measuring", "calculating", "receiving", "computing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

With reference now to FIG. 2, portions of the present method and apparatus for auto-detection of LAN, Modem, or ISDN utilizing a common connection to peripheral component are comprised of computer-readable and computer-executable instructions which reside, for example, in computer-usable media of a computer system. FIG. 2 illustrates an exemplary computer system 100 used to perform the method in accordance with one embodiment of the present invention. It is appreciated that system 100 of FIG. 2 is exemplary only and that the present invention can operate within a number of different computer systems including general purpose networked computer systems, embedded computer systems, and stand alone computer systems. Additionally, computer system 100 of FIG. 2 is well adapted having computer readable media such as, for example, a floppy disk, a compact disc, and the like coupled thereto. Such computer readable media is not shown coupled to computer system 100 in FIG. 2 for purposes of clarity.

System 100 of FIG. 2 includes an address/data bus 102 for communicating information, and a central processor unit 104 coupled to bus 102 for processing information and instructions. Central processor unit 104 may be an 80×86-family microprocessor. System 100 also includes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage unit 110 (e.g., a magnetic or optical disk and disk drive) coupled to bus 102 for storing information and instructions. System 100 of the present invention also includes an optional alphanumeric input device 112 including alphanumeric and function keys is coupled to bus 102 for communicating information and command selections to central processor unit 104. System 100 also optionally includes a cursor control device 114 coupled to bus 102 for communicating user input information and command selections to central processor unit 104. System 100 of the present embodiment also includes an optional display device 116 coupled to bus 102 for displaying information.

Referring still to FIG. 2, optional display device 116 of FIG. 2, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. A more detailed discussion of the embodiments of the present invention, a method and apparatus for auto-detection of LAN, Modem, or ISDN utilizing a common connection to peripheral component, are found below.

With reference still to FIG. 2, significantly, a network interface card (NIC) 118 coupled to bus 102 is connected to a network 120 and controls the flow of information over network 120. Data packets, such as Ethernet packets, that are incoming arrive at NIC 118 via network 120 and are stored in FIFO memory 140 of NIC 118 before being transferred to other hardware and software of computer system 100.

Figure 3:
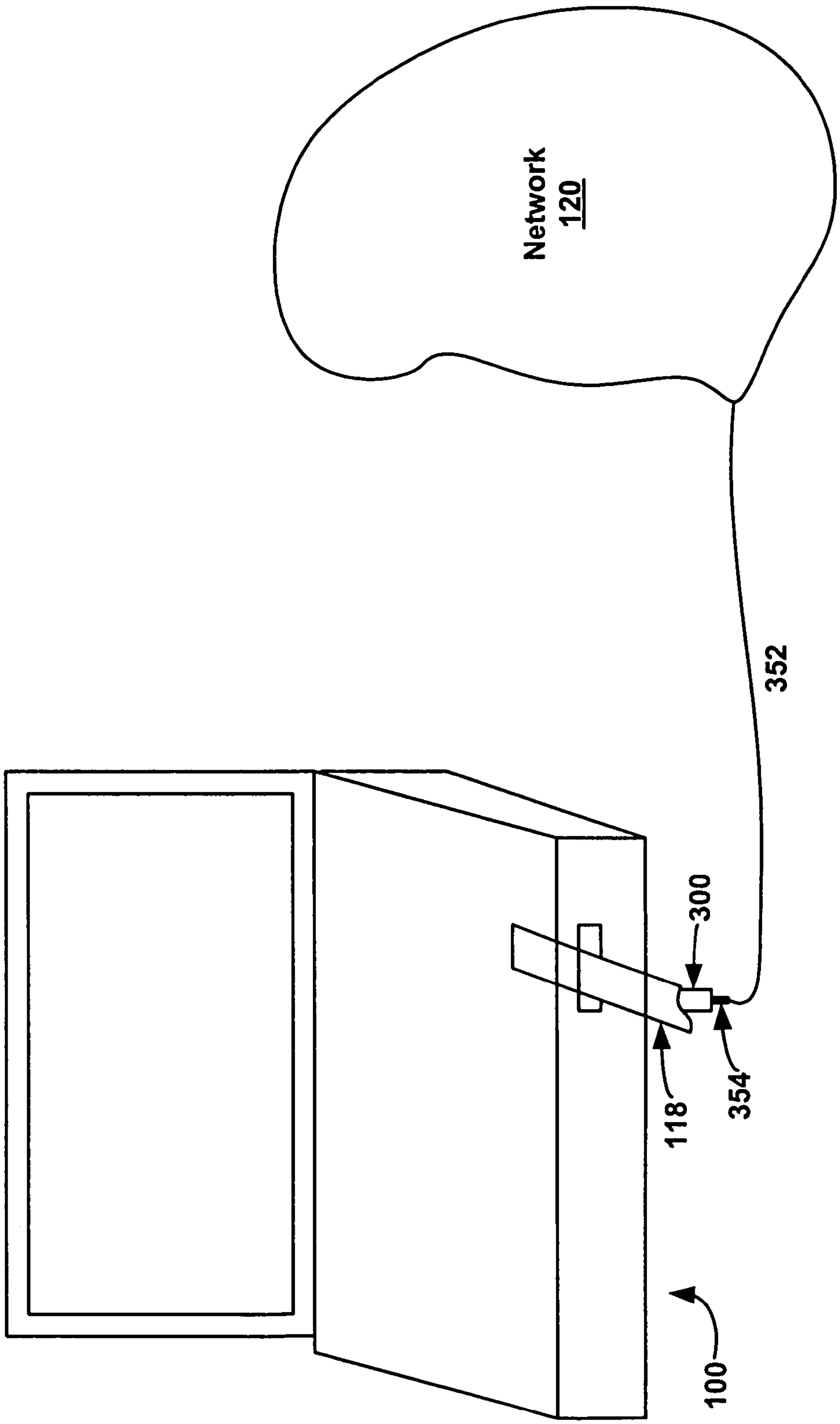
FIG. 3 is an illustration of a peripheral component inserted into a host computer system, in accordance with one embodiment of the present invention.

FIG. 3 illustrates how a peripheral component is used. A peripheral component 118 (e.g., a network interface card, NIC) is inserted into computer system 100. A cable 352 having a connector jack 354 is plugged into a receptacle 300 of the peripheral component 118. The cable 352 interfaces with a network 120. In this fashion, the computer system 100 may now access the network 120. Although the present embodiment states that peripheral component 118 is, in one example, a NIC, the present invention is also well suited to use with various other types of peripheral components. Such peripheral components include, but are not limited to, PC cards, PCMCIA cards, and the like.

Figure 4:
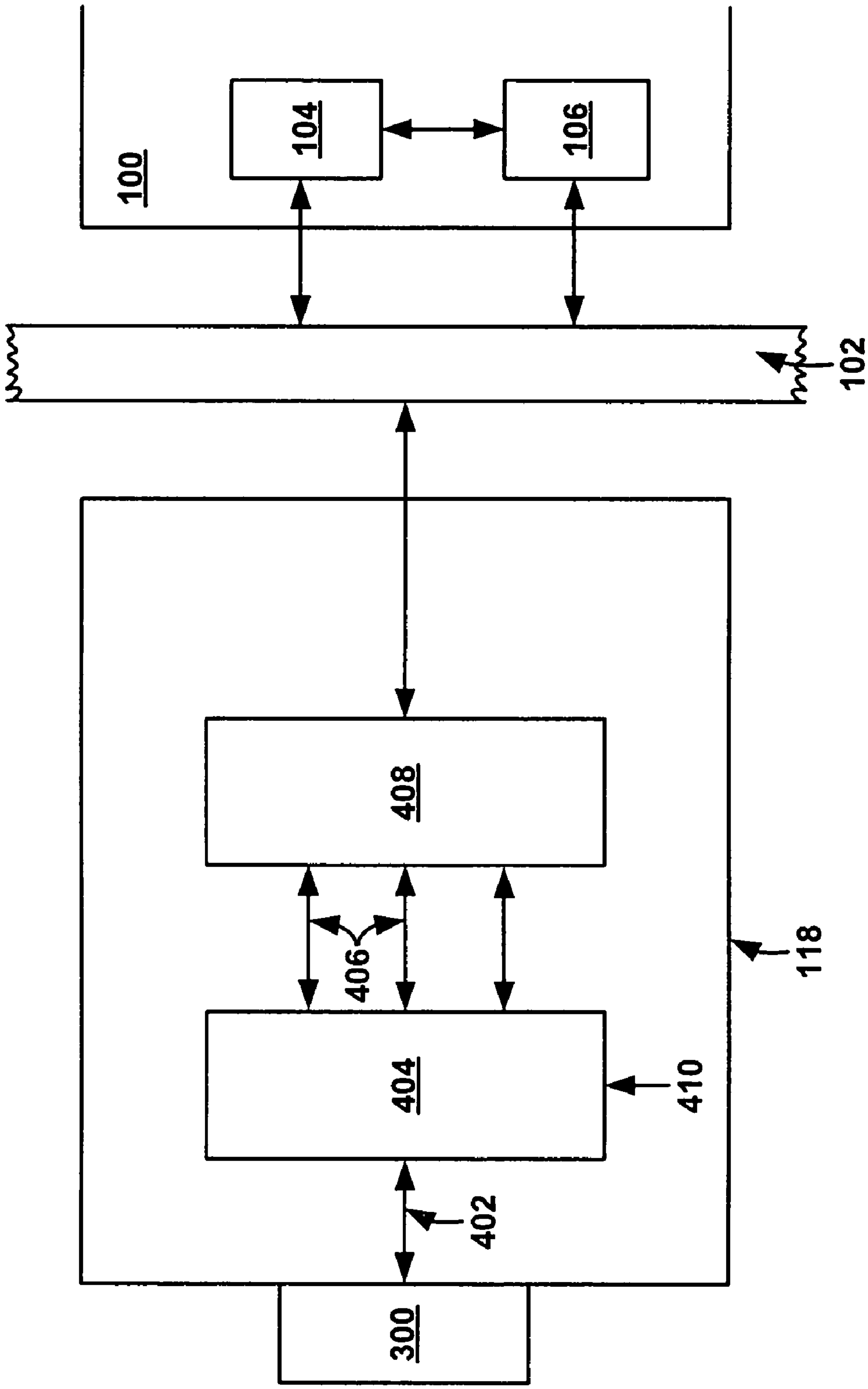
FIG. 4 is an schematic diagram of some of the logical circuitry on a peripheral component, in accordance with one embodiment of the present claimed invention.

FIG. 4 shows a peripheral component 118 with some logic circuitry, in accordance with one embodiment of the present invention. The peripheral component 118 has a receptacle 300 coupled to it for receiving a connector jack 354 (FIG. 3). The receptacle 300 may be, for example, an RJ-11 or an RJ-45, which are well known in industry. The receptacle 300 has a number of electrical connecting lines 402, which are utilized as signal lines by the various connection-types 160. These electrical connecting lines 402 feed into switching logic 404. Switching logic 404 is connected to a number of electrical pathways 406 which feed into connection-type determination logic 408. A control signal 410 is input to the switching logic 404. Also shown in FIG. 4 are computer system 100 and PCI bus 102. In such an embodiment, peripheral component 118 is adapted to interface physically to and communicate via the PCI bus protocols. However, peripheral component 118 may also interface physically to and communicate via other bus protocols, such as EISA, Microchannel, SCSI, or the like.

Figure 5:
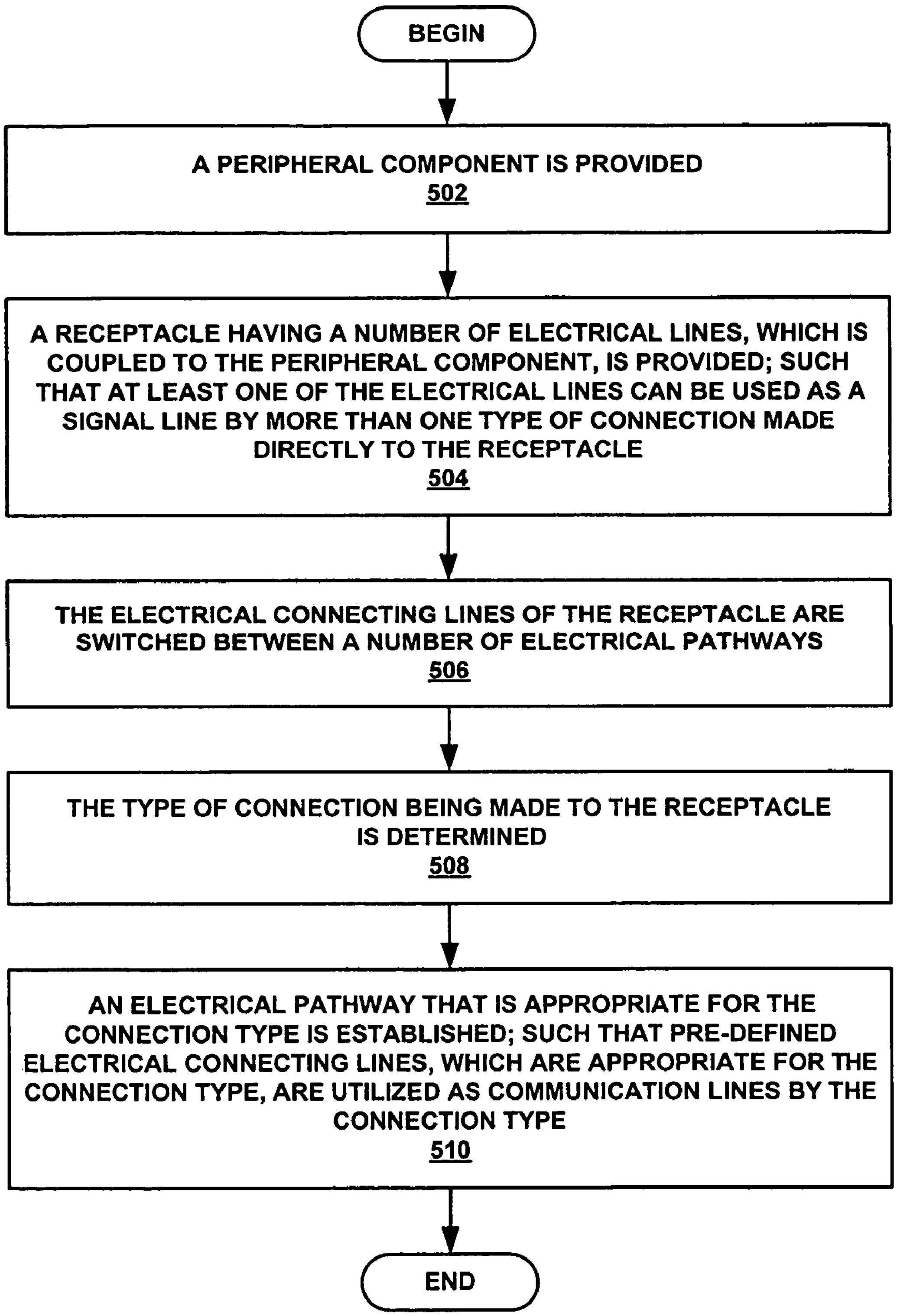
FIG. 5 is a flowchart of the steps of allowing multiple types of connections to be made to the peripheral component, in accordance with one embodiment of the present invention.

FIG. 5 is a flowchart illustrating steps performed in the present embodiment in order to allow multiple types of connections 160 to be made to a peripheral component 118. In step 502, a peripheral component 118 is provided. For example, the peripheral component may be a NIC, a PC card, a PCMCIA card, or the like.

In step 504, a receptacle 300, which is coupled to the peripheral component, 118 is provided. The receptacle 300 has a number of electrical connecting lines 402, and at least one of the electrical connecting lines 402 is adapted to be utilized as a signal line for more than one type of connection 160 being made to the receptacle 300. For the purposes of one embodiment of the present invention, the signal lines are defined to be the fourth and fifth electrical connecting lines 402 for modem 150; the first, second, third, and sixth electrical connecting lines 402 for LAN 152; and the third through sixth electrical connecting lines 402 for ISDN 154. Thus, the third and sixth electrical connecting lines 402 are common signal lines for ISDN 154 and LAN 152, and the fourth and fifth electrical connecting lines 402 are common signal lines for modem 150 and ISDN 154. However, it will be understood that the present invention is well-suited to utilizing other electrical connecting lines 402 as signal lines. For example, in another embodiment of the present invention, the eighth electrical line 402 could be a signal line for modem 150 and ISDN 154, and thus function as a common signal line.

In step 506, the present embodiment switches the electrical connecting lines 402 of the receptacle 300 between a number of electrical pathways 406. Each electrical pathway 406 connects to a specific portion of the connection-type determination logic 408. For example, one pathway leads to LAN determination logic, another to modem determination logic, and another to ISDN determination logic. In this manner, one portion of the connection-type determination logic 408 is connected to the receptacle 300 at a time.

In step 508, the present embodiment determines the type of connection 160 being made to the receptacle 300. For example, whether the connection-type 160 is LAN 152, modem 150, or ISDN 154. The present invention is well-suited to determining that other types of connections 160, such as DSL, are being made as well.

In step 510, the present embodiment establishes an electrical pathway 406, which is appropriate for the connection-type 160. Consequently, the connection-type 160 utilizes pre-defined electrical connecting lines 402 as communication lines. In one embodiment, the pre-defined electrical connecting lines used as communication lines 402 are determined according to industry standards as shown in FIG. 1. However, in another embodiment, other electrical lines 402 may be used by the connection-types 160. For example, modem 150 could use the seventh and eighth electrical lines 402 as communication lines.

Figure 6:
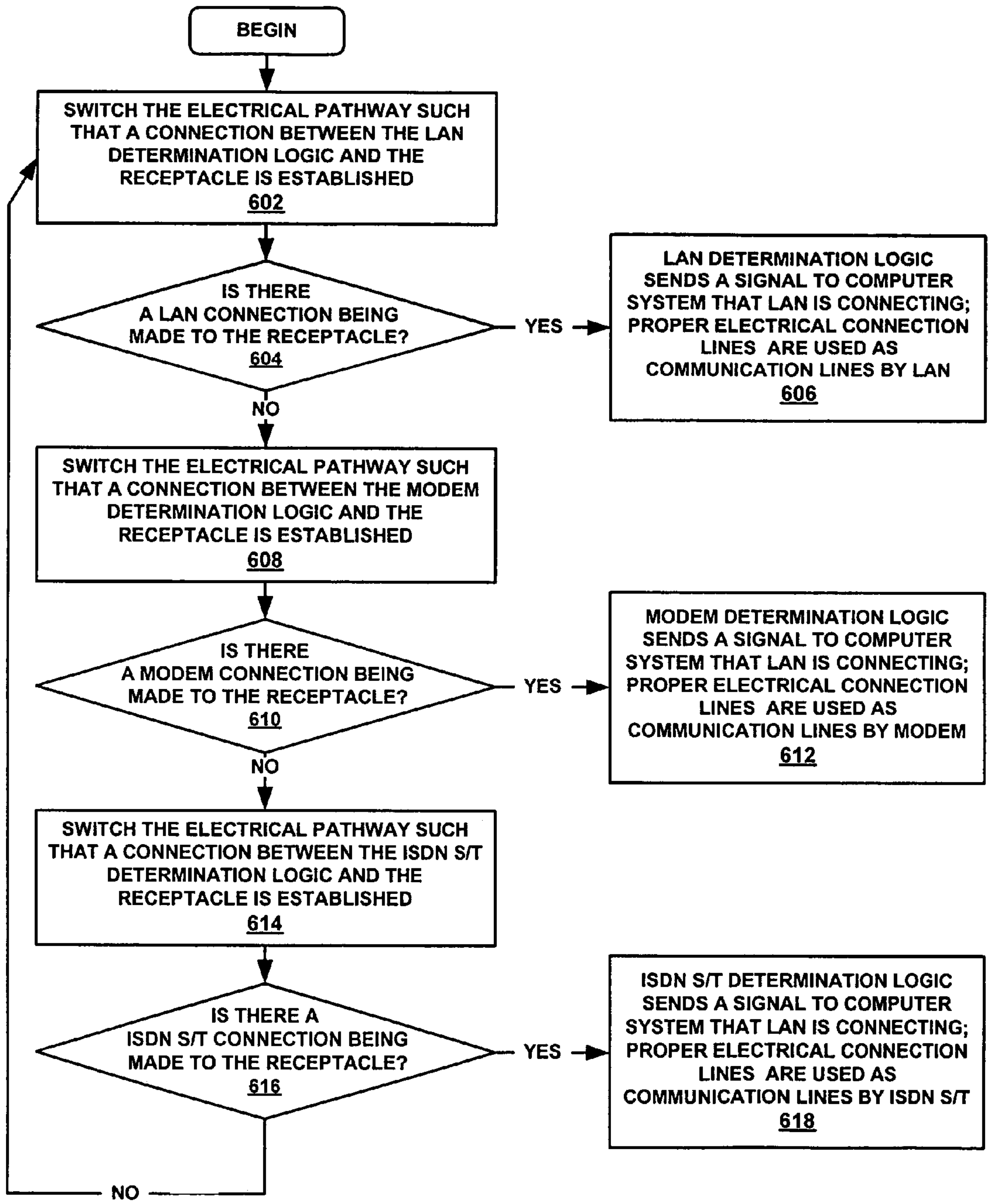
FIG. 6 is a flowchart of the steps of switching the electrical lines of the receptacle between multiple connection-type determination devices, in accordance with one embodiment of the present invention.

FIG. 6 shows steps performed in accordance with one embodiment of the present invention to determine whether the type of connection 160 to the receptacle 300 is a LAN 152, a modem 150, or an ISDN 154. In step 602, the present embodiment switches the electrical pathway 406 such that an electrical connection is made between LAN determination logic 510 (FIG. 7) and the receptacle 300. Furthermore, the modem determination logic 511 (FIG. 7) and the ISDN determination logic 512 (FIG. 7) will not be connected to the receptacle 300 due to this switching.

In step 604, the LAN determination logic 510 determines whether a LAN connection 152 is being made to the receptacle 300. As the modem 511 (FIG. 7) and ISDN 512 (FIG. 7) determination logic are not connected to the receptacle, they will not falsely determine that a connection of their type is being made.

If the LAN determination logic 510 detect a connection being made, then step 606 is performed in which the LAN determination logic 510 (FIG. 7) sends a signal to the computer system 100, and the appropriate electrical connecting lines 402 are used as communication lines by the LAN connection-type 152.

If the LAN determination logic 510 (FIG. 7) fails to detect a LAN connection 152, then step 608 is performed in which the switching logic 404 switches to the electrical pathway 406 forming an electrical connection between the modem determination logic 511 (FIG. 7) and the receptacle 300.

In step 610, the modem determination logic 511 (FIG. 7) determines whether a modem connection 150 is being made to the receptacle 300. In this step, the present embodiment disconnects the LAN determination logic 510 (FIG. 7) and the ISDN determination logic 512 (FIG. 7) from the receptacle if necessary.

If the modem determination logic determines a connection is being made, step 612 is performed. In step 612, the modem determination logic 511 sends a signal to the computer system 100 that a modem connection 150 is being made. Also, the proper electrical lines 402 for a modem connection 150 are used as communication lines.

If the modem determination logic 511 (FIG. 7) fails to detect a modem connection 152, then step 614 is performed in which the switching logic 404 switches to the electrical pathway 406 forming an electrical connection between the ISDN determination logic 512 (FIG. 7) and the receptacle 300. Furthermore, the modem determination logic 511 is disconnected from the receptacle 300 and the LAN determination logic 510 is kept disconnected from the receptacle 300.

In step 610, the ISDN determination logic 512 (FIG. 7) determines whether an ISDN connection 154 is being made to the receptacle 300. Because the ISDN determination logic 512 uses lines common to the LAN 510 and modem 511 determination logic, it is very important that they are not connected at this point. If they were, confusion could ensue as to the proper connection-type 160. However, the present embodiment, only allows one type of determination logic to connect to the receptacle 300 at a time. Thus, this problem is solved.

If the ISDN determination logic 512 determines that a connection is being made, step 618 is performed. In step 618, the ISDN determination logic 512 sends a signal to the computer system 100 that an ISDN connection 154 is being made to the receptacle 300. Also, the proper electrical lines 402 for an ISDN connection 154 are used as communication lines. If the ISDN determination logic 512 (FIG. 7) fails to detect an ISDN connection, then step 602 is performed again.

Figure 7:
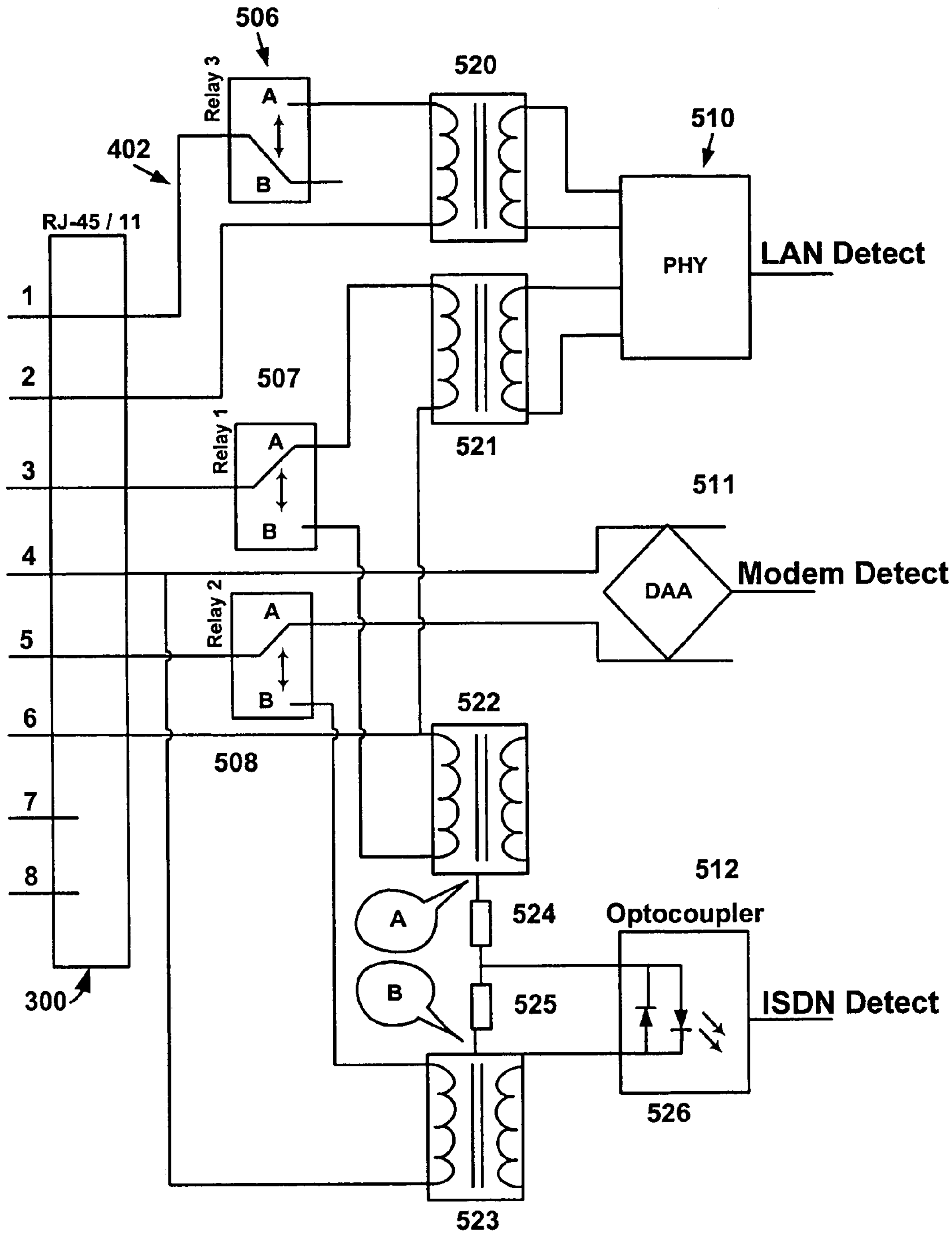
FIG. 7 is a schematic diagram of a portion of a peripheral component showing circuitry to switch the electrical connection lines of the receptacle between multiple connection-type determination devices, in accordance with one embodiment of the present claimed invention.

FIG. 7 shows, in greater detail, some of the circuitry of peripheral component 118. Receptacle 300, which may be an RJ-45 or an RJ-11 allows a connector jack 354 (FIG. 3) to be inserted therein. Receptacle 300 has a number of electrical lines 402 feeding into relay-3 506, relay-1 507, and relay-2 508. The relays form part of the switching logic 404 shown in FIG. 4. While the relays shown are two-way relays with an “A” and a “B” position, the present invention is well-suited for three-way relays and other types of relays as well. Also shown are LAN determination logic 510, which has a physical interface (PHY) and is widely used to detect a LAN connection; modem determination logic 511, which is a Data Access Arrangement (DAA) and is widely used in industry; and ISDN determination logic 512, which comprises an optocoupler 526, transformers 522 and 523, and resistors 524 and 525. Also shown are isolation transformers 520 and 521.

The process of connecting each determination logic 408 to the electrical connecting lines 402 will now be described in greater detail, according to one embodiment of the present invention. Relays 506–508 may be controlled by signals 410 which may originate from either computer system 100 or the determination logic 408. The control signals 410 instruct each relay whether to be in either the “A” or “B” position. When switching the LAN determination logic 510 to the electrical connecting lines 402, relay 506 is set to the “A” position, and relay 507 is also set to the “A” position. It does not matter what position relay 508 is in. Consequently, electrical connecting 402 lines 1, 2, 3, and 6 are connected to isolation transformers 520 and 521. Thus, LAN determination logic 510 is connected to TD+, TD−, RD+, and RD−, (see FIG. 1) which are the relevant electrical lines 402 of the receptacle 300. In another embodiment, other electrical connecting lines 402 may be used to connect the LAN determination logic 510 to the necessary signal lines. For example, if TD+, and TD− are on the seventh and eighth electrical connecting lines 402, then the LAN determination logic 510 is connected to those lines instead of the first and second electrical connecting lines 402.

In order to connect the modem determination logic 511 to the electrical connecting lines 402, relay 508 must be set to position “A”. The position of relays 506 and 507 do not matter. Consequently, the modem determination logic 511 is connected to the appropriate electrical connecting lines 402, which are lines 4 and 5. These lines are defined in FIG. 1 as Tip and Ring, according to industry standard. As is well known in the industry, the Data Access Arrangement (DAA) may now detect a loop current, if there is one. However, the present invention is well-suited to using other electrical connecting lines 402 if Tip and Ring are on other electrical connecting lines 402.

Greater detail of connecting the ISDN determination logic 512 to the electrical connection lines 402 will now be described. The present invention connects the ISDN determination logic 510 to TD+, TD−, RD+, and RD− of the ISDN connection 152. These are shown in FIG. 7 to be electrical connection lines (402) 3, 4, 5, and 6 respectively. However, it will be understood that other electrical connection lines could be used, if TD+, TD−, RD+, and RD− are connected to other electrical lines 402. In the present embodiment, the upper terminal of transformer 522 is always connected to TD−, which is on the sixth electrical connecting line 402. Relay 507 is set to position "B". This will connect TD+, which is on the third electrical connecting line 402, to the lower terminal of transformer 522. The lower terminal of transformer 523 is always connected to RD+, which is on the fourth electrical connecting line 402. Relay 508 is set to position "B", thus connecting the upper terminal of isolation transformer 523 to RD−, which is on the fifth electrical connecting line 402. The position of relay 506 does not matter. Resistors 524 and 525 are connected to center taps of the transformers 522 and 523 respectively. An optocoupler senses the voltage across resistor 525. Consequently, the ISDN determination logic 512 is connected to the appropriate electrical connection lines 402, which are lines 3–6 as seen in FIG. 1, according to industry standard. In another embodiment, RD+, RD−, TD+, or TD− could be on other electrical lines; consequently, other electrical connecting lines 402 would be connected to the ISDN determination logic 512.

FIG. 8 shows a table of the appropriate positions for relays 506–508, to switch a given connection-type determination logic 408 to the receptacle 300, according to one embodiment of the present invention. The dashes represent "don't care" positions for the relays 506–508. "A" and "B" position refer to relay positions in FIG. 7.

In one embodiment of the present invention, multiple types of connections 160 may be made to a peripheral component 118 without requiring an intermediate connection device. In this embodiment, the connector jack 354 plugs directly into the receptacle 300. This applies whether the connector jack 354 is for a LAN 152, a modem 150, or an ISDN 154. Thus, the user is not required to plug an intermediate connection device into the receptacle 300, and then plug the connector jack 354 into the receptacle 300. The present embodiment describes the connections 160 as being either LAN 152, modem 150, or ISDN 154, as ISDN shares a common signal line with the other two. However, the present invention is well-suited for other connections, such as, for example DSL, which share a common signal line with at least one other connection-type 160.

Therefore, it will be seen that the present auto-detection of LAN, modem, and ISDN invention allows multiple types of connections, such as LAN, modem, and ISDN to be made to a single peripheral component. The present invention does not use an intermediate connection device. The present invention is low in cost, easy to use, and compact. The present invention further provides a method and apparatus which allows the user to connect a LAN, a modem, or an ISDN to a single peripheral component without considering the connection-type.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A peripheral component that allows telephone dial-up modem, Integrated Services Digital Network (ISDN), or Ethernet connection to a host computing device via said peripheral component, said peripheral component comprising:

- a receptacle having a plurality of electrical connecting lines, wherein at least one of said plurality of electrical connecting lines receives a signal used to detect more than one type of connection to be made directly to said receptacle;
- connection type detection logic that allows determination if said connection type is telephone dial-up modem, ISDN, or Ethernet; and
- switching logic adapted to couple appropriate ones of the electrical connecting lines to said connection type detection logic to allow detection of telephone dial-up modem, ISDN, and Ethernet connection types to the peripheral component.

2. A peripheral component as recited in claim 1, wherein said connection type detection logic is operable to detect the type of connection by a physical test.

3. A peripheral component as recited in claim 1, wherein said connection type detection logic uses a physical test that is different for at least one connection type.

4. A peripheral component as recited in claim 1, wherein said connection type detection logic is operable to detect at least one type of connection by detecting a voltage.

5. A peripheral component as recited in claim 4, wherein said connection type detection logic is operable to detect at least one type of connection by detecting a current.

6. A peripheral component as recited in claim 1, wherein said connection type detection logic is operable to detect at least one type of connection by detecting a current.

7. A method for allowing multiple types of connections to be made to a peripheral component using a common receptacle comprising:

- switching appropriate electrical connecting lines of said peripheral component to electrically couple an Ethernet detection device to said receptacle, wherein at least one of said electrical connecting lines is used to detect more than one type of connection made directly to said peripheral component;
- determining if said peripheral component is coupled to an Ethernet connection;
- switching appropriate electrical connecting lines of said peripheral component to electrically couple telephone dial-up modem detection logic to said receptacle;
- determining if said peripheral component is coupled to a telephone dial-up modem connection;
- switching appropriate electrical connecting lines of said peripheral component to electrically couple ISDN detection logic to said receptacle;
- determining if said peripheral component is coupled to an ISDN connection; and
- sending a signal to a host computer indicating a type of connection being made to said peripheral component, if any.

* * * * *